US010505884B2

(12) United States Patent
Hentschel et al.

(10) Patent No.: US 10,505,884 B2
(45) Date of Patent: Dec. 10, 2019

(54) ENTITY CLASSIFICATION AND/OR RELATIONSHIP IDENTIFICATION

(71) Applicant: Microsoft Technology Licensing, LLC, Redmond, WA (US)

(72) Inventors: Martin Hentschel, San Francisco, CA (US); Omar Alonso, Redwood Shores, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 819 days.

(21) Appl. No.: 14/732,134

(22) Filed: Jun. 5, 2015

(65) Prior Publication Data

US 2016/0357870 A1    Dec. 8, 2016

(51) Int. Cl.
| | |
|---|---|
| *G06F 16/28* | (2019.01) |
| *H04L 12/58* | (2006.01) |
| *G06F 16/901* | (2019.01) |
| *G06F 16/2457* | (2019.01) |
| *G06Q 30/02* | (2012.01) |
| *G06Q 50/00* | (2012.01) |
| *G06F 16/36* | (2019.01) |

(52) U.S. Cl.
CPC ........ *H04L 51/32* (2013.01); *G06F 16/24575* (2019.01); *G06F 16/285* (2019.01); *G06F 16/288* (2019.01); *G06F 16/367* (2019.01); *G06F 16/9024* (2019.01); *G06Q 30/0201* (2013.01); *G06Q 50/01* (2013.01)

(58) Field of Classification Search
CPC ......... G06F 17/30598; G06F 17/30958; H04L 51/32
See application file for complete search history.

(56) References Cited

U.S. PATENT DOCUMENTS

| | | | |
|---|---|---|---|
| 7,873,595 B2 | 1/2011 | Singh et al. | |
| 9,201,945 B1 * | 12/2015 | Garrett | ................ G06F 17/3071 |
| 2003/0182310 A1 * | 9/2003 | Charnock | ......... G06F 17/30716 |

(Continued)

OTHER PUBLICATIONS

"International Search Report and Written Opinion Issued in PCT Application No. PCT/US2016/035608", dated Jul. 15, 2016, 12 Pages.

(Continued)

*Primary Examiner* — Kris E Mackes
(74) *Attorney, Agent, or Firm* — Watson Patents, PLC; Vladan M. Vasiljevic

(57) ABSTRACT

One or more techniques and/or systems are provided for identifying relationships between entities and/or for classifying entities into sectors. Social network commentary of users may be evaluated to select comments having co-occurrences of entity identifiers and/or co-occurrences of entity identifiers with sector identifiers. For example, a microblog message "I love these stores!! $CO(A) $CO(B) #ShoeShopping" may have a co-occurrence of entity identifiers $CO(A) of a Company (A) entity and $CO(B) of a Company (B) entity along with co-occurrence with a #Shoe-Shopping sector identifier of a Retail Clothing sector. A relationship between the Company (A) entity and the Company (B) entity may be specified based upon the co-occurrence of the entity identifiers. A sector classification of the Retail Clothing sector may be assigned to the Company (A) entity and to the Company (B) entity based upon the co-occurrence of the entity identifiers $CO(A) and $CO(B) with the #ShoeShopping sector identifier.

20 Claims, 12 Drawing Sheets

(56) References Cited

U.S. PATENT DOCUMENTS

| | | | |
|---|---|---|---|
| 2006/0242040 A1* | 10/2006 | Rader | G06Q 40/00 705/35 |
| 2013/0117253 A1 | 5/2013 | Wang et al. | |
| 2013/0297694 A1 | 11/2013 | Ghosh | |
| 2013/0325660 A1* | 12/2013 | Callaway | G06Q 30/0609 705/26.35 |
| 2014/0040387 A1 | 2/2014 | Spivack et al. | |
| 2015/0081713 A1 | 3/2015 | Alonso et al. | |
| 2015/0120680 A1 | 4/2015 | Alonso et al. | |
| 2015/0331866 A1* | 11/2015 | Shen | G06F 17/30861 707/723 |

OTHER PUBLICATIONS

Jin, et al., "Ranking Companies Based on Multiple Social Networks Mined from the Web", In Proceedings of International Conference on Innovative Technologies, Sep. 2010, 25 pages. http://cdn.intechopen.com/pdfs-wm/10151.pdf.

Kramida, Gregory, "Analysis of Stock Symbol Co-occurrences in Financial Articles", retrieved on: May 16, 2014, pp. 7, Available at: https://wiki.cs.umd.edu/cmsc734_f13/images/9/9f/Analysis_of Stock_Symbol_Co-occurences_in_Financial_Articles.pdf.

Zheludev, et al., "When Can Social Media Lead Financial Markets?", In Scientific Reports 4, Article No. 4213, Feb. 27, 2014, 16 pages. http://www.nature.com/srep/2014/140227/srep04213/pdf/srep04213.pdf\.

"Trading on Sentiment", Published on: Feb. 10, 2011, pp. 18 Available at: http://blog.manishsood.net/tag/social-media/.

"Trending on Twitter: Social Sentiment Analytics", Published on: Feb. 20, 2014, pp. 4 Available at: http://www.bloomberg.com/now/2014-02-20/trending-on-twitter-social-sentiment-analytics/.

* cited by examiner

ENTITY CLASSIFICATION AND/OR RELATIONSHIP IDENTIFICATION

BACKGROUND

Many users may utilize social networks to discover and share information with other users. In an example, a user may create a social network post "I just had the best time at Water Park XYZ" to share with social network friends. In another example, the user may share a photo of a sports car at a car dealership in order to obtain opinions from social network friends about the sports car. In another example, the user may read social network posts about a new videogame console release in order to make a videogame console purchase decision. In this way, users may share commentary about entities, such as companies, consumer products, public figures, sports teams, and/or other people, places, and things, through social networks.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for identifying relationships between entities and/or for classifying entities into sectors are provided herein. In an example of identifying relationships between entities, a comment by a user may be selected from social network data of a social network. The comment comprises a first identifier of a first entity and a second identifier of a second entity. A relationship between the first entity and the second entity is specified based upon a co-occurrence of the first entity identifier and the second entity identifier within the comment. A search query corresponding to the first entity is received. At least one of a related search suggestion of the second entity or a search result associated with the second entity is included within search results for the search query based upon the relationship.

In an example of classifying entities into sectors, a comment by a user may be selected from social network data of a social network. The comment comprises an entity identifier of an entity and a sector identifier of a sector. A sector classification is specified for the entity based upon co-occurrence of the entity identifier and the sector identifier within the comment, where the sector classification corresponds to the sector. A sector search query is received. Responsive to the sector search query corresponding to the sector, a list of entities, having sector classifications corresponding to the sector, is included within search results for the sector search query. The list of entities comprises the entity.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
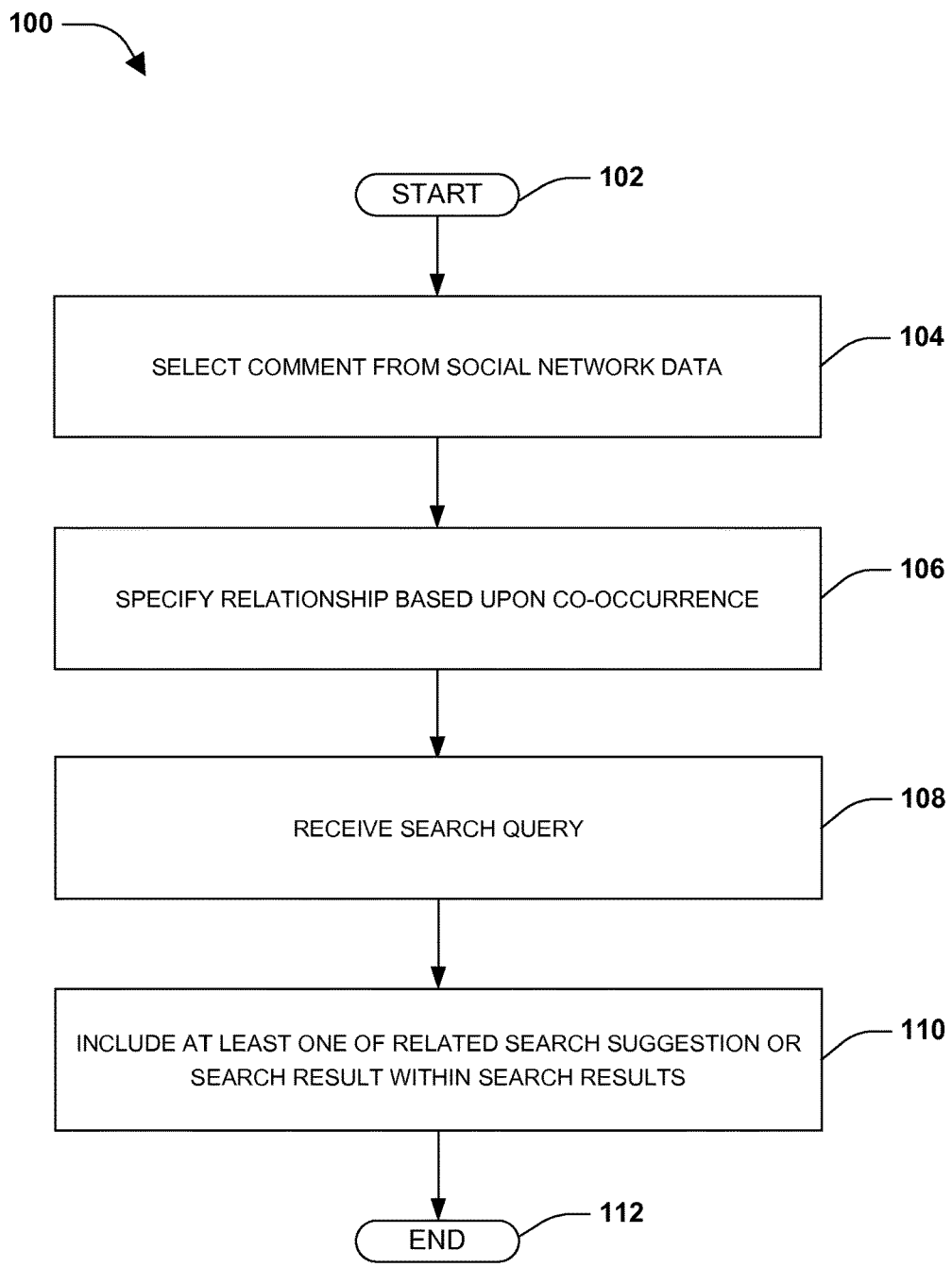
FIG. 1 is a flow diagram illustrating an exemplary method of identifying relationships between entities.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for identifying relationships between entities and/or for classifying entities into sectors are provided herein. Many users may utilize social networks as commentary mediums for discussing public opinions regarding entities (e.g., microblogs, social network posts, forum posts, and/or other social network commentary regarding entities such as companies, public figures, products, locations, etc.). Identifying relationships between entities (e.g., an Electronics Company may have a new relationship with a Car Company based upon the Electronics Company supplying new navigation systems for the Car Company) and/or classifying entities into sectors (e.g., a Retail Store entity may be classified into a videogame sector or other classification/topic) may allow a content provider to provide robust and/or relevant information to users. For example, a user with an interest in the Electronics Company may find information about the Car Company useful (e.g., for investment purposes, for car purchase purposes, etc.). It may be appreciated that an entity may be anything (e.g., person, place, thing, etc.) that may be of interest to a user, and that a sector may be any type of classification for an entity. For example, an entity may be a company, a location, a person, a consumer product, etc. A company that manufactures computers may be classified into an electronics sector and/or a computer sector, for example.

Accordingly, as provided herein, relationships between entities and/or sector classifications for entities, that may otherwise go unnoticed, may be identified automatically and/or programmatically based upon co-occurrence of entity identifiers and/or sector identifiers within commentary of social network data (e.g., social network posts, microblogs, forums, messages, and/or other information that may be indicators of public opinion regarding entities and/or sectors). In this way, social network data may be leveraged to identify such relationships and/or sector classifications based upon public commentary and opinions.

Mining social network data is an efficient manner of timely identifying relationships between entities and/or sector classifications for entities because social network data is typically more relevant or fresh as compared to other types of data (e.g., a few infrequently published articles). Additionally, the vast amount of social network data may provide an accurate insight into trending relationships and/or classifications. For example, two companies may not be engaged in a business transaction at a first time, and thus little to no social network data (e.g., blogs, posts, etc.) would concurrently mention or have co-occurrences of the two companies at the first time. However, the two companies may engage in a business transaction at a second time, and thus co-occurrence of the two companies in social network data (e.g., both companies mentioned together in blogs, posts, etc.) may become much more prevalent at the second time (e.g., many online articles, blogs, microblogs, re-publications of microblogs, responses to microblogs, etc. may pertain to the Electronics Company supplying to the new navigation system to the Car Company).

The volume of social network data that has co-occurrences of the two companies at any time increases the likelihood of there being a relationship between the two companies at the time. Accordingly, relationships between entities and/or sector classifications for entities may be determined accurately in an efficient manner as provided herein (e.g., as compared to other techniques, such as in a manual or non-programmatic fashion, that may provide potentially misleading or inaccurate results).

A relationship metric may thus be specified between entities, where a value of the relationship metric may be indicative of the strength or veracity of the relationship. The value of the relationship metric may change over time as the relationship changes over time, as reflected in social media data. For example, where co-occurrences of the two companies increases/decreases in social media data, the value of the relationship metric may increase/decrease. The value of the relationship metric may thus fall below a threshold at the first time and indicate a lack of a relationship between the two entities at the first time, but may exceed the threshold at the second time and thus indicate the relationship between the two entities at the second time.

A sector correlation metric may similarly be specified for an entity and a sector, where a value of the sector correlation metric may be indicative of whether the entity should be classified or associated with the sector (e.g., based upon a number of co-occurrences of an entity identifier of the entity and a sector identifier of the sector within one or more comments of social network data). In an example, a first number of co-occurrences of a first entity identifier of a first entity and a first sector identifier of a first sector in a comment or in multiple comments may yield a first correlation metric, and a second number of co-occurrences of a second entity identifier of a second entity and a second sector identifier of a second sector in a comment or in multiple comments may yield a second correlation metric. The first correlation metric may be greater than the second correlation metric where the first number of co-occurrences is greater than the second number of co-occurrences, for example. In an example, the first correlation metric may exceed a threshold whereas the second correlation metric may not exceed the threshold such that the first entity is to be classified in the first sector but the second entity is not to be classified in the second sector. Given that social media data changes, the first correlation metric may subsequently not exceed the threshold whereas the second correlation metric may exceed the threshold such that the first entity is not to be classified in the first sector but the second entity is to be classified in the second sector. Classifications of entities into sectors may thus be dynamically updated based upon changes in social media data, and freshness of relationships between entities may be similarly maintained.

Moreover, determining relationships between entities and/or sector classifications for entities based upon co-occurrence of entity identifiers and/or sector identifiers within social network data can provide more accurate results with less bandwidth consumption and/or processing resource utilization as compared to other techniques. For example, a significant number of queries may have to be run for a particular entity and/or a vast amount of corresponding search results may have to be analyzed to discern a classification of the entity and/or a relationship between the entity and another entity. Such an analysis may consume a considerable amount of bandwidth and/or processing resources to find any such correlation, and any such correlation may not be very accurate depending upon search engines used, search results obtained, correlation algorithms used, etc. For example, search results for a large software company over a period of time may include many other companies given the reach of the large software company. However, social network data over that same period of time may be less likely to have such a large spread of other companies (e.g., given that social network users generally comment on trending or current events), and thus any correlation(s) between the large software company and other companies derived from social network data are likely to be stronger and/or less noisy (e.g., few to no social network posts may include both the large software company and other companies with which the large software company does not have a relationship around and/or during at least some of the period of time).

Finding co-occurrence of entity identifiers and/or sector identifiers within readily available social network data would thus likely consume less bandwidth and/or utilize fewer processing resources as few to no search queries would need to be conducted (e.g., traffic to a server hosting a search engine, traffic to crawl websites, etc.), few to no search results would need to be retrieved, few to no search results would need to be analyzed, results are likely to be less noisy or more pointed to relationships between entities and/or sector classifications for entities, etc. Rather, existing social network data would merely need to be examined for co-occurrence of entity identifiers and/or sector identifiers, and/or a number or amount of such identifiers tracked to gauge a strength of a correlation (e.g., a frequency or number of co-occurrences of an entity identifier of the Retail Store entity with a sector identifier of the videogame sector in social network data that exceeds a threshold for a time (e.g., a 1 day timeframe, a 1 week timeframe, a 1 moth timeframe, a shopping holiday timeframe, and/or other timeframe(s)) may be a strong indication that the Retail Store entity should be classified in the videogame sector). A social network user may take affirmative action, such as providing opt-in consent, to allow access to and/or use of social network data (e.g., social network posts, microblogs, social network messages, etc.), such as for the purpose of identifying relationships between entities and/or sector classifications for entities (e.g., where the online user responds to a prompt regarding the collection and/or use of such information).

An embodiment of identifying relationships between entities is illustrated by an exemplary method 100 of FIG. 1. At 102, the method starts. Users of social networks may engage in commentary about entities, such as through social network posts, messages, microblogs, forums, etc. (e.g., a social network post "I cannot wait to go to the gaming convention this year!!" tagged with $gamecompany, $tabletcompany, and #videogames). Such social network data may be leveraged to accurately identify relationships between entities, such as people, places, things, companies, and/or other types of entities, where such relationships may otherwise go unnoticed. Such relationships can be presented to users and/or utilized to enhance search results, for example. Search results for a first entity may, for example, include a reference to a second entity where a relationship between the first entity and the second entity has been identified based upon social network data. Automated identification of relationships based upon social network data may mitigate computing resource and/or bandwidth utilization as compared to more rudimentary, manual or brute force techniques. Automated identification of relationships based upon social network data may provide dynamic up-to-date relationship identifications as opposed to merely static compositions of related companies.

At 104, a comment by a user may be selected from social network data of a social network (e.g., the social network post "I cannot wait to go to the gaming convention this year!!" tagged with $gamecompany, $tabletcompany, and #videogames). The comment may comprise a first entity identifier of a first entity (e.g., $gamecompany entity identifier may be indicative of a Game Company entity) and a second entity identifier of a second entity (e.g., $tabletcompany entity identifier may be indicative of a Tablet Company entity). It may be appreciated that an entity may comprise any sort of entity, such as people (e.g., a public figure), places (e.g., a beach resort town), things (e.g., a company, a consumer product, a car, an image, an idea, etc.), etc. It may be appreciated that any type of identifier may be identified as an entity identifier (e.g., a cashtag, a hashtag, an entity name such as a company name, an entity logo such as a sports team logo, an image, a link to an entity social network profile, a link to an entity website, an identifying phrase or text such as a company slogan, etc.). In an example, comments within the social network data may be filtered or not selected based upon spam scores (e.g., comments having spam scores above a threshold may not be selected), quality scores (e.g., comments having quality scores below a threshold may not be selected, such as comments with numerous grammatical errors, misleading information, incorrect information, profanity, etc.), and/or other filters.

At 106, a relationship may be specified between the first entity and the second entity based upon co-occurrence of the first entity identifier and the second entity identifier within the comment. For example, a relationship metric may be specified for the relationship between the first entity and the second entity (e.g., where the relationship metric, or a value thereof, may be indicative of the veracity of the relationship). A value for the relationship metric may be determined and/or updated based upon a number of co-occurrences of the first entity identifier and the second entity identifier within comments (e.g., out of 5,000 comments having the first entity identifier, 3,000 of the comments had co-occurrence of the first entity identifier and the second entity identifier). In an example, a co-occurrence table may be populated with entries where an entry corresponds to a comment (e.g., a social network post identifier for the social network post "I cannot wait to go to the gaming convention this year!!") and an entity identifier that occurred within the comment (e.g., a tag such as a cashtag $gamecompany). For example, a first entry may correspond to the social network post "I cannot wait to go to the gaming convention this year!!" and the cashtag $gamecompany, a second entry may correspond to the social network post "I cannot wait to go to the gaming convention this year!!" and the cashtag $tabletcompany, etc. In this way, a plurality of comments may be selected to populate the co-occurrence table. The co-occurrence table may be evaluated to determine a value for the relationship metric based upon a count of co-occurrences of the first entity identifier and the second entity identifier (e.g., a self-join may be performed to join the co-occurrence table with itself to create a new table comprising pairs of entity identifiers that occur together so that a group by entity identifier pair function may be performed to obtain a count of co-occurrences of entity identifiers).

Relationships between entities may be dynamically updated using fresh social network data (e.g., real-time updates may be performed as relationships between entities form and are identified from social network data). For example, updated social network data may be evaluated to determine updated relationship information derived from co-occurrence of the first entity identifier and the second entity identifier within the updated social network data (e.g., a relatively low co-occurrence of the first entity identifier and the second entity identifier may be determined). The relationship may be updated (e.g., the value of the relationship metric, indicating a strength or veracity of the relationship, may be reduced to indicate a weaker relationship or changed to indicate a lack of a relationship) based upon the updated relationship information. In an example, the updated social network data may be evaluated to identify new relationships.

In an example, a graph may be built based upon relationships between entities. The graph may comprise a set of nodes, representing entities, connected by a set of edges representing relationships. For example, a first node may represent the first entity, a second node may represent the second entity, and an edge between the first node and the second node may represent the relationship between the first entity and the second entity. One or more related entity clusters may be identified based upon the graph (e.g., a related entity cluster may comprise entities that are represented by nodes connected by edges that represent relationships having relationship metrics above a threshold).

In an example, the graph may be displayed as an interactive graph interface (e.g., through an application, a website, etc.). The interactive graph interface may apply edge width properties to representations of edges within the interactive graph interface. An edge width property of an edge may comprise a value corresponding to a strength of a relationship represented by the edge (e.g., thicker edges may represent stronger relationships whereas thinner edges may represent weaker relationships). The interactive graph interface may apply color properties to representations of edges and/or nodes based upon types of entities represented by the nodes (e.g., the first node, the second node, and the edge between the first node and the second node may be colored blue based upon the Game Company entity and the Tablet Company entity being classified into a videogame sector classification; a third node may be colored red based upon a Storage Company entity being classified into a cloud sector classification; etc.).

At 108, a search query corresponding to the first entity may be received. For example, a user may submit the search query through a search interface. The search query may correspond to the first entity (e.g., a search query "what new games are coming out by the Game Company"). At 110, a related search suggestion (e.g., a Tablet Company suggestion linking to a new search for search results related to the Tablet Company entity) and/or a search result associated with the second entity (e.g., a Tablet Company website, a stock quote for the Tablet Company entity, news relating to the Tablet Company entity, etc.) may be included within search results for the search query based upon the relationship. For example, the related search suggestion and/or the search result may be included in response to the relationship between the first entity and the second entity exceeding a threshold (e.g., the relationship between the Game Company entity and the Tablet Company entity may have a relationship metric above the threshold). In another example, responsive to determining that a user interface comprises a reference to the first entity (e.g., a website or application user interface may display a logo or name of the Game Company entity), a ranked list of entities having relationships with the first entity above a threshold may be displayed. An entity list element, within the ranked list of entities, may comprise a link to a search for search results corresponding to a related entity. In this way, a user may be provided with relevant and/or useful information about the second entity that the user may otherwise not become aware of by merely searching for the first entity (e.g., the user may not realize that the second entity is related to the first entity and that information about the second entity may be helpful to the user in efficiently completing a search task). At 112, the method ends.

Figure 2:
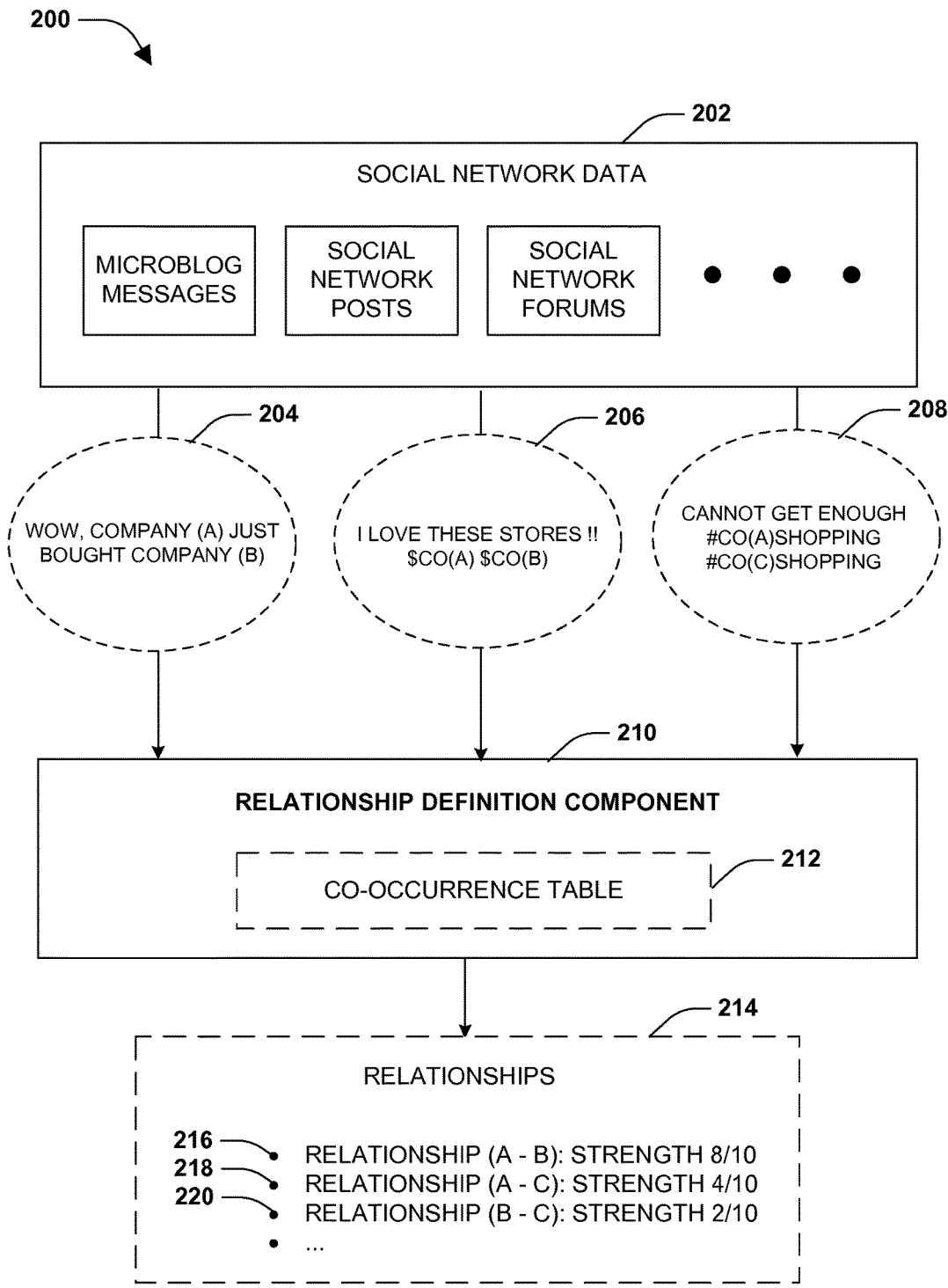
FIG. 2 is a component block diagram illustrating an exemplary system for identifying relationships between entities.

FIG. 2 illustrates an example of a system 200 for identifying relationships between entities. The system 200 comprises a relationship definition component 210. The relationship definition component 210 may be configured to select comments by users from social network data 202, such as microblog messages, social network posts, social network forums, and/or other data sources and/or services through which users may provide commentary. For example, a first comment 204 "wow, Company (A) just bought Company (B)" may be identified as comprising an entity identifier "Company (A)" of a Company (A) entity and an entity identifier "Company (B)" of a Company (B) entity (e.g., entity identifiers comprising textual references to entities). A second comment 206 "I love those stories!! $Co(A) $Co(B)" may be identified as comprising an entity identifier $Co(A) of the Company (A) entity and an entity identifier $Co(B) of the Company (B) entity (e.g., entity identifiers comprising tags, such as cashtags). A third comment 208 "Cannot get enough #Co(A)Shopping #Co(C)Shopping" may be identified as comprising an entity identifier #Co(A) Shopping of the Company (A) entity and an entity identifier #Co(C)Shopping" of a Company (C) entity (e.g., entity identifiers comprising tags, such as hashtags indicative of entities).

The relationship definition component 210 may build and/or populate a co-occurrence table 212 based upon the comments from the social network data 202. For example, the co-occurrence table 212 may comprise a first entry corresponding to the first comment 204 (e.g., a unique comment ID for the first comment 204) and the entity identifier "Company (A)", a second entry corresponding to the first comment 204 and the entity identifier "Company (B)", a third entry corresponding to the second comment 206 and the entity identifier $Co(A), a fourth entry corresponding to the second comment 206 and the entity identifier $Co(B), a fifth entry corresponding to the third comment 208 and the entity identifier #Co(A)Shopping, a sixth entry corresponding to the third comment 208 and the entity identifier #Co(C)Shopping, etc. In an example where different types of entity identifiers are supported (e.g., text, cashtags, hashtags, image logo recognition, and/or other identifiers), variations in entity identifiers for an entity (e.g., $Co(A), $CompanyA, Company (A), etc.) may be normalized for counting co-occurrences of entity identifiers. The co-occurrence table 212 may be evaluated to determine values for relationship metrics of relationships between entities based upon a count of co-occurrences of the entity identifiers (e.g., a self-join may be performed to join the co-occurrence table 212 with itself to create a new table comprising pairs of entity identifiers that occur together so that a group by entity identify pair function may be performed to obtain a count of co-occurrences of entity identifiers). In this way, co-occurrence of entity identifiers within comments may be used to specify relationships 214 between entities, such as a first relationship 216, having a relationship metric of 8/10, between the Company (A) entity and the Company (B) entity, a second relationship 218, having a relationship metric of 4/10, between the Company (A) entity and the Company (C) entity, a third relationship 220, having a relationship metric of 2/10, between the Company (B) entity and the Company (C) entity, etc.

Figure 3:
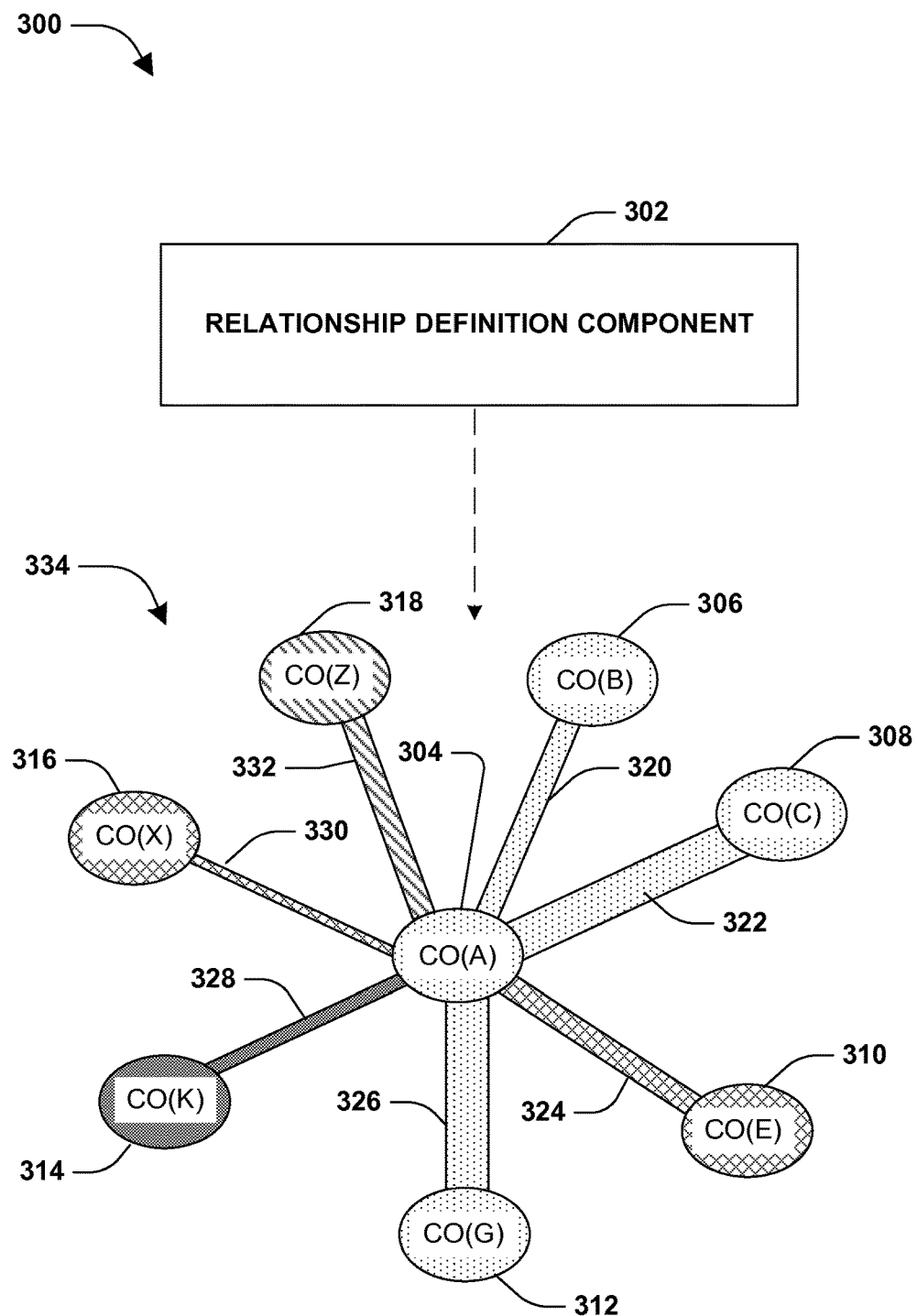
FIG. 3 is a component block diagram illustrating an exemplary system for building a graph that may be displayed as an interactive graph interface.

FIG. 3 illustrates an example of a system 300 for building a graph 334 that may be displayed as an interactive graph interface. The system 300 comprises a relationship definition component 302. The relationship definition component 302 may utilize relationships (e.g., relationships 214 of FIG. 2) between entities to build the graph 334. The graph 334 may comprise a set of nodes representing entities, such as a Company (A) node 304, a Company (B) node 306, a Company (C) node 308, a Company (E) node 310, a Company (G) node 312, a Company (K) node 314, a Company (X) node 316, a Company (Z) node 318, and/or other nodes not illustrated.

The graph 334 may comprise a set of edges connecting nodes based upon relationships between entities represented by such nodes. In an example, a Company (A) entity may be specified as a focus entity for the graph 334, and thus edges of the graph 334 may represent varying degrees of relationships between the Company (A) entity and other entities. For example, a first relationship edge 320 between the Company (A) node 304 and the Company (B) node 306 may represent a first relationship between the Company (A) entity and a Company (B) entity. A second relationship edge 322 between the Company (A) node 304 and the Company (C) node 308 may represent a second relationship between the Company (A) entity and a Company (C) entity. A third relationship edge 324 between the Company (A) node 304 and the Company (E) node 310 may represent a third relationship between the Company (A) entity and a Company (E) entity. A fourth relationship edge 326 between the Company (A) node 304 and the Company (G) node 312 may represent a fourth relationship between the Company (A) entity and a Company (G) entity. A fifth relationship edge 328 between the Company (A) node 304 and the Company (K) node 314 may represent a fifth relationship between the Company (A) entity and a Company (K) entity. A sixth relationship edge 330 between the Company (A) node 304 and the Company (X) node 316 may represent a sixth relationship between the Company (A) entity and a Company (X) entity. A seventh relationship edge 332 between the Company (A) node 304 and the Company (Z) node 318 may represent a seventh relationship between the Company (A) entity and a Company (Z) entity.

Color properties may be specified for nodes and/or edges based upon entities types. For example, a first color may be assigned to the Company (A) node 304, the Company (B) node 306, the Company (C) node 308, the Company (G) node 312, the first relationship edge 320, the second relationship edge 322, and the fourth relationship edge 326 based upon the Company (A) entity, the Company (B) entity, the Company (C) entity, and the Company (G) entity relating to a health care sector classification of entities (e.g., a medical device company, an insurance company, etc.). A second color may be assigned to the third relationship edge 324, the Company (E) node 310, the sixth relationship edge 330, and the Company (X) node 316 based upon the Company (E) entity and the Company (X) entity relating to a sports sector classification of entities. A third color may be assigned to the fifth relationship edge 328 and the Company (K) node 314 based upon the Company (K) entity relating to a nutrition sector classification of entities. A fourth color may be assigned to the seventh relationship edge 332 and the Company (Z) node 318 based upon the Company (Z) entity relating to a shoes sector classification of entities. Edge width properties may be assigned to relationship edges based upon strengths of relationships between entities (e.g., large edge width properties may be assigned to the second relationship edge 322 and the fourth relationship edge 326 based upon the Company (A) entity having strong relationships with the Company (C) entity and the Company (G) entity; a small edge width property may be assigned to the sixth relationship edge 330 based upon the Company (A) entity having a weak relationship with the Company (X) entity; etc.). In this way, the graph 334 may be built and displayed as the interactive graph interface so that users may visually identify relationships between entities and strengths of such relationships.

Figure 4:
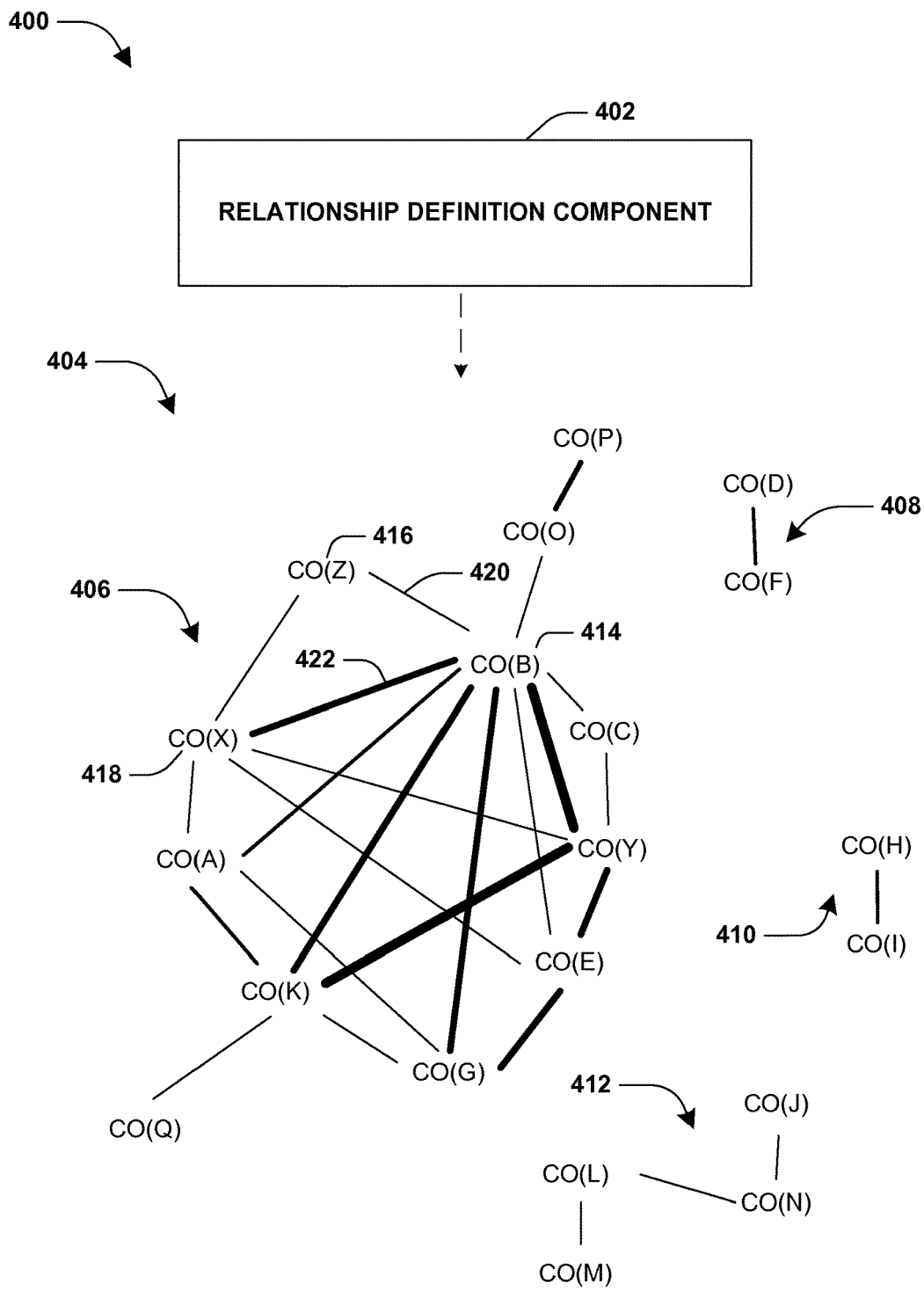
FIG. 4 is a component block diagram illustrating an exemplary system for building a graph that may be displayed as an interactive graph interface.

FIG. 4 illustrates an example of a system 400 for building a graph 404 that may be displayed as an interactive graph interface. The system 400 comprises a relationship definition component 402. The relationship definition component 402 may utilize relationships (e.g., relationships 214 of FIG. 2) between entities to build the graph 404. In an example, the graph 404 may be a global graph of entities that may provide a global perspective of how entities may be related to one another (e.g., as opposed to the graph 334 of FIG. 3 where the Company (A) entity was the focus of the graph 334). The graph 404 may comprise a set of nodes representing entities, such as a Company (B) node 414, a Company (X) node 418, a Company (Z) node 416, and/or other nodes. The graph 404 may comprise a set of edges connecting nodes based upon relationships between entities represented by such nodes. For example, a first relationship edge 420, having a relatively small edge width property, may connect the Company (B) node 414 and the Company (Z) node 416 based upon a relatively weaker relationship between a Company (B) entity and a Company (Z) entity. A second relationship edge 422, having a relatively larger edge width property, may connect the Company (B) node 414 and the Company (X) node 418 based upon a relatively stronger relationship between the Company (B) and a Company (X).

One or more related entity clusters may be identified within the graph 404. For example, a first entity cluster 406 may comprise nodes connected by edges having relationship metrics above a threshold. A second entity cluster 408 may comprise a Company (D) node and a Company (F) node based upon a Company (D) entity having a relationship with a Company (F) entity above the threshold. A third entity cluster 410 may comprise a Company (H) node and a Company (I) node based upon a Company (H) entity having a relationship with a Company (I) entity above the threshold. A fourth entity cluster 412 may comprise nodes connected by edges having relationship metrics above the threshold. The graph 404 may be filtered based upon various filters (e.g., stock price, revenue, entity/sector type, etc.). In this way, the graph 404 may be built and displayed as the interactive graph interface so that users may visually identify, at a global or macroscopic level, relationships between entities and strengths of such relationships.

Figure 5:
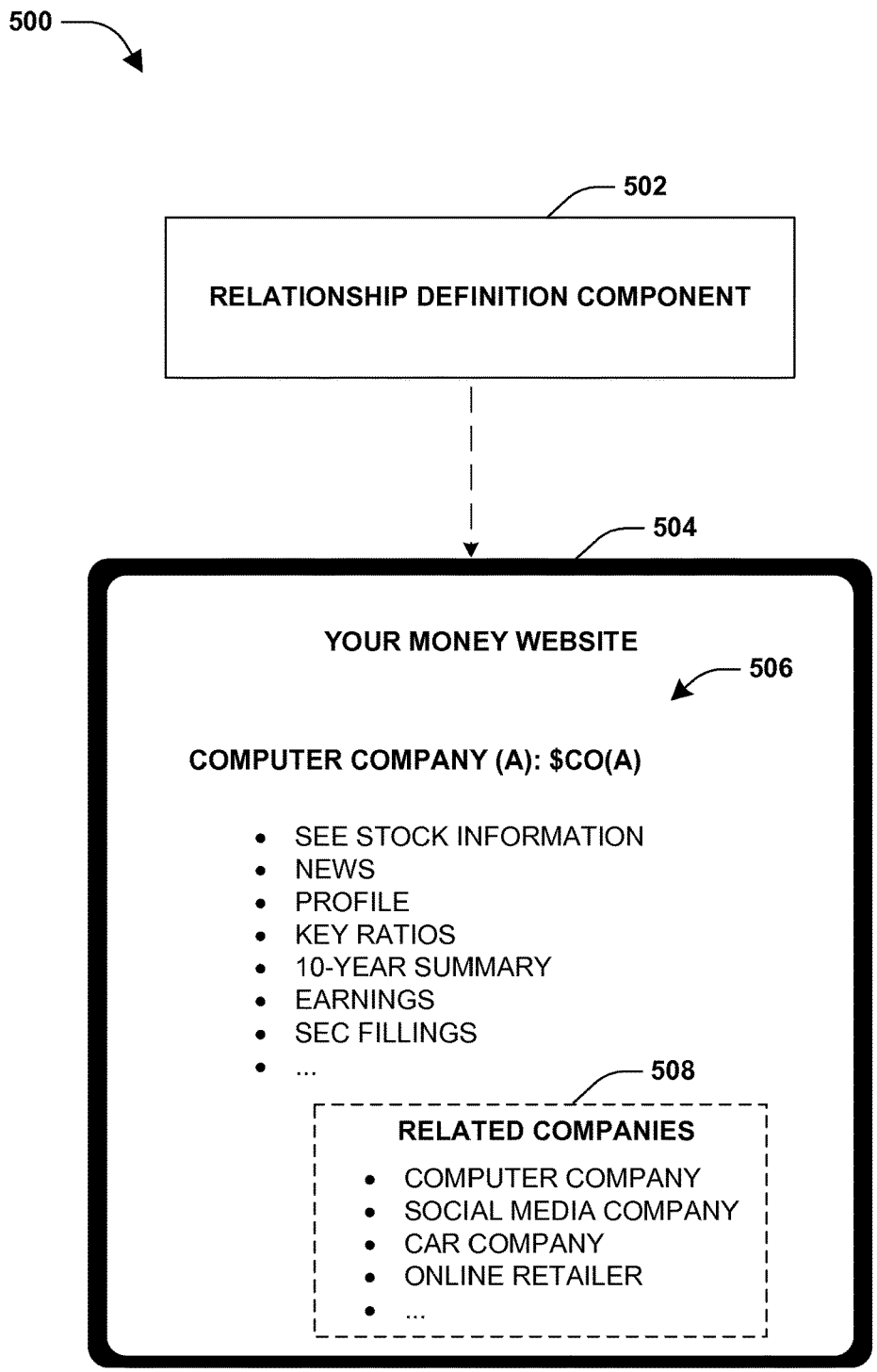
FIG. 5 is a component block diagram illustrating an exemplary system for displaying related entity information based upon relationships identified between entities.

FIG. 5 illustrates an example of a system 500 for displaying related entity information based upon relationships identified between entities. The system 500 comprises a relationship definition component 502. The relationship definition component 502 may be associated with a client device 504 (e.g., the relationship definition component 502 may be hosted on the client device 504, hosted by a server that is connected to but remote from the client device 504, or partially hosted on the client device 504 and partially hosted on the server). A user of the client device 504 may navigate to a Computer Company (A) entity summary webpage 506 of a Your Money website. The relationship definition component 502 may evaluate the Computer Company (A) entity summary webpage 506 to identify a Computer Company (A) entity identifier for a Computer Company (A) entity (e.g., #Co(A)). The relationship definition component 502 may evaluate relationships between entities (e.g., relationships 214 of FIG. 2, graph 334 of FIG. 3, graph 404 of FIG. 4, etc.) to identify a ranked list of entities that have relationships with the Company (A) entity above a threshold, such as a Computer Company, a Social Media Company, a Car Company, an Online Retailer, etc. The ranked list of entities may be displayed through a related entity information interface, such as a related companies information interface 508 of the Computer Company (A) entity summary webpage 506.

Figure 6:
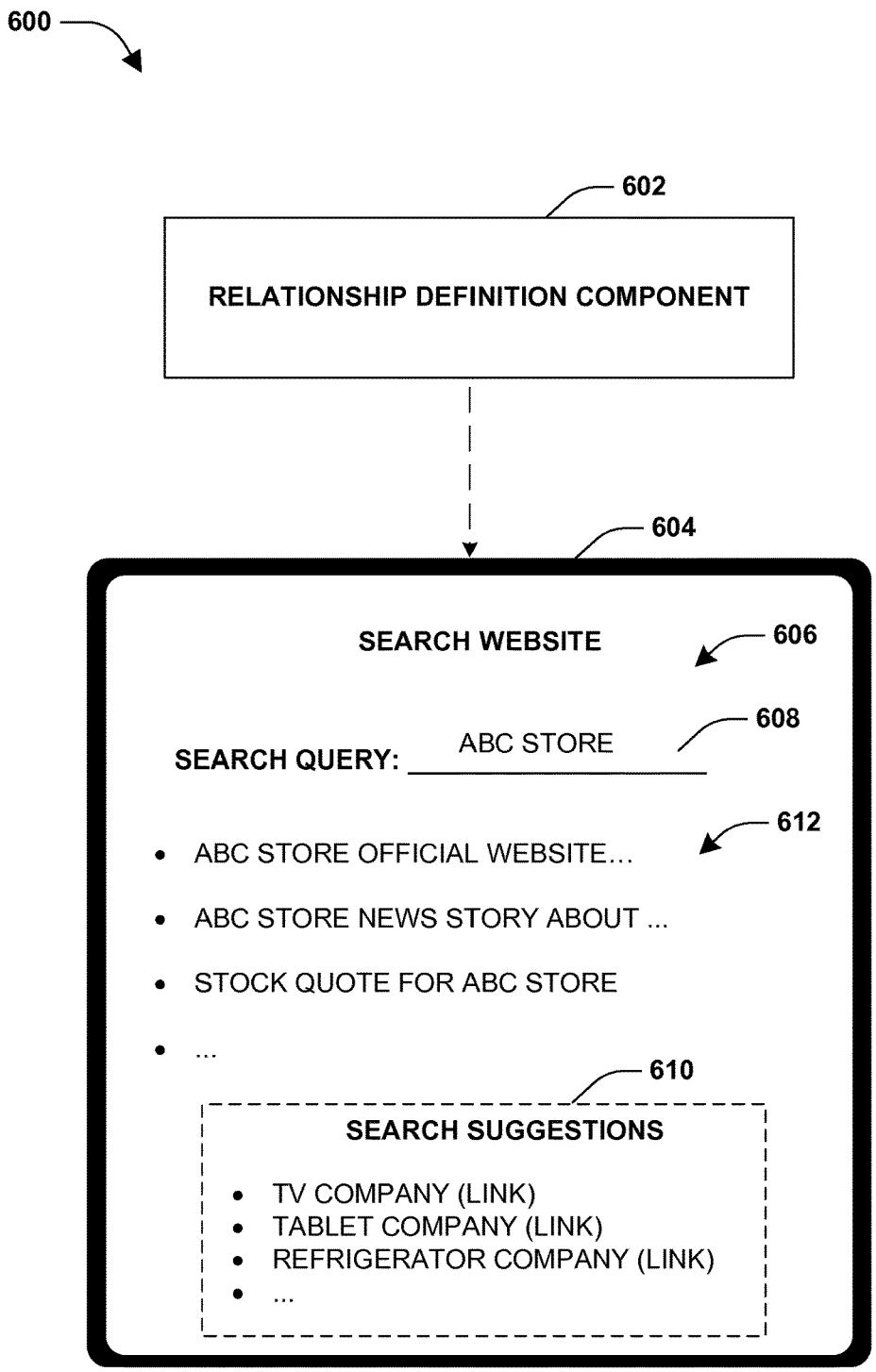
FIG. 6 is a component block diagram illustrating an exemplary system for displaying related entity information based upon relationships identified between entities.

FIG. 6 illustrates an example of a system 600 for displaying related entity information based upon relationships identified between entities. The system 600 comprises a relationship definition component 602. The relationship definition component 602 may be associated with a client device 604 (e.g., the relationship definition component 602 may be hosted on the client device 604, hosted on a server that is connected to but remote from the client device 604, or partially hosted on the client device 604 and partially hosted on the server). A user of the client device 604 may navigate to search website 606. The user may submit a search query 608 "ABC Store" through the search website 606. The relationship definition component 602 may evaluate the search query 608 "ABC Store" to identify a reference to an ABC Store entity. The relationship definition component 602 may evaluate relationships between entities (e.g., relationships 214 of FIG. 2, graph 334 of FIG. 3, graph 404 of FIG. 4, etc.) to identify one or more entities having relationships with the ABC Store entity above a threshold, such as a TV Company entity, a Tablet Company entity, a Refrigerator Company entity, etc. A set of search suggestions 610, comprising links to searches for search results relating to the TV Company entity, the Tablet Company entity, and/or the Refrigerator Company entity, may be included within a search results page 612 for the search query 608 "ABC Store".

Figure 7:
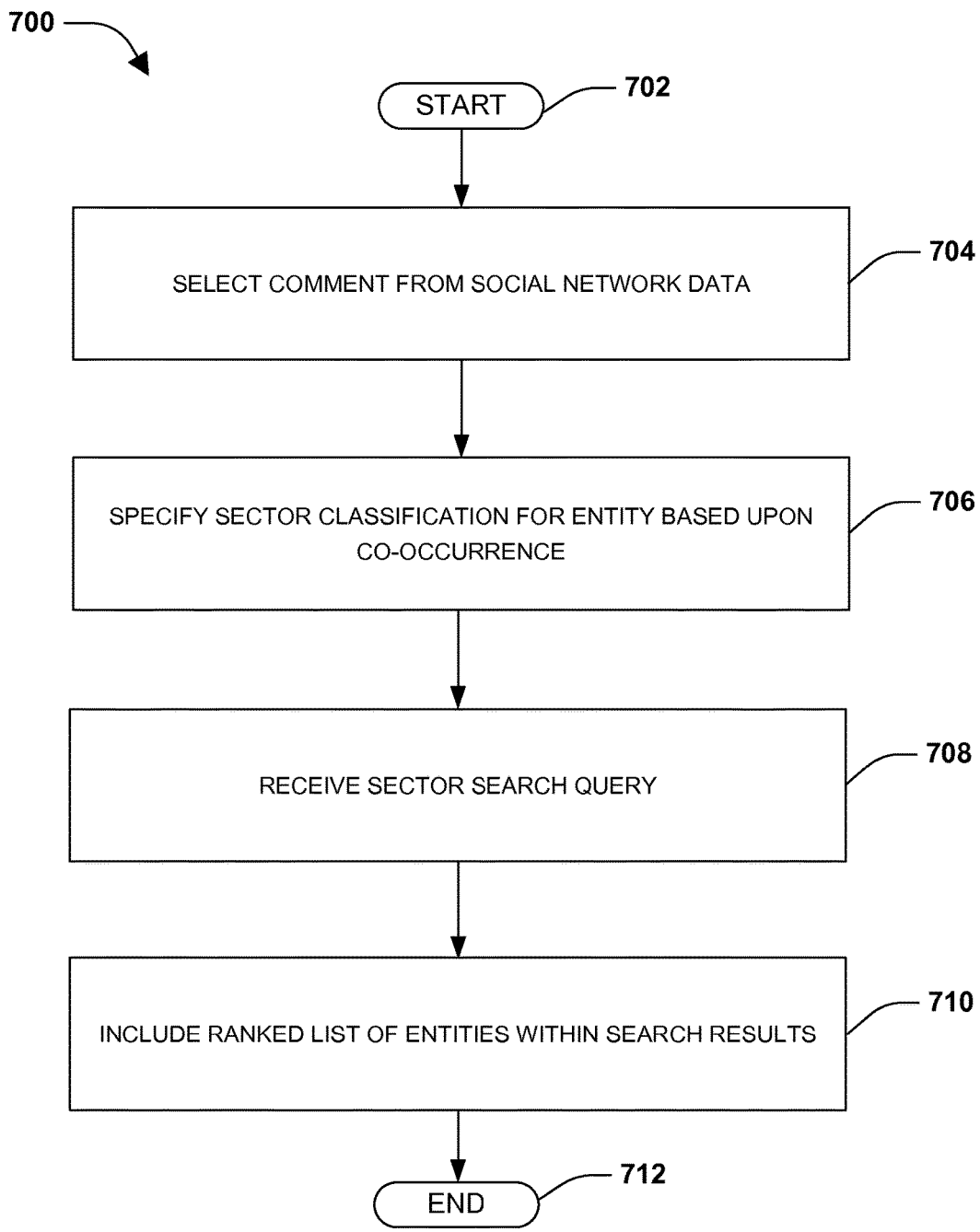
FIG. 7 is a flow diagram illustrating an exemplary method of classifying entities into sectors.

An embodiment of classifying entities into sectors is illustrated by an exemplary method 700 of FIG. 7. At 702, the method starts. Users of social networks may engage in commentary about entities, such as through social network posts, messages, microblogs, forums, etc. (e.g., a microblog message "I love shopping here" tagged with $StoreA and #LoveClothing). Such social network data may be leveraged to accurately identify sectors (e.g., a cloud computing sector, a health sector, a computer sector, a videogame sector, an oil sector, etc.) with which entities (e.g., people, places, and things, such as companies) may be associated or classified. Such sectors can be presented to users and/or utilized to enhance search results, for example. Search results for a first entity may, for example, include a reference to a sector where the first entity has been associated with the sector based upon social network data. Automated sector classification of an entity based upon social network data may mitigate computing resource and/or bandwidth utilization as compared to more rudimentary, manual or brute force techniques. Automated sector classification may provide dynamic up-to-date sector classifications as opposed to merely static classifications that may become stale as new emerging sectors arise (e.g., as entities engage in cloud computing, nanotechnology, etc.).

At 704, a comment by a user may be selected from social network data of a social network (e.g., the microblog message "I love shopping here" tagged with $StoreA and #LoveClothing). The comment may comprise an entity identifier of an entity (e.g., $StoreA entity identifier may be indicative of a Store (A) Company entity) and a sector identifier of a sector (e.g., #LoveClothing sector identifier may be indicative of a Retail Clothing sector). It may be appreciated that text, hashtags, image recognition of a photo, audio and/or image recognition of a video, and/or any other identification information may be used to identify a sector identifier and/or an entity identifier. In an example, comments of the social network data may be filtered or not selected based upon spam scores (e.g., comments having spam scores above a threshold may not be selected), quality scores (e.g., comments having quality scores below a threshold may not be selected, such as comments with numerous grammatical errors, misleading information, incorrect information, profanity, etc.), and/or other filters.

At 706, a sector classification for the entity may be specified based upon co-occurrence of the entity identifier and the sector identifier within the comment. In an example, a plurality of comments may be evaluated to identify co-occurrences of entity identifiers and sector identifiers for sector classification (e.g., a value for a sector correlation metric between the entity and the sector may be determined based upon a number of co-occurrences of the entity identifier and the sector identifier within comments of social network data). A set of comments having co-occurrence of the entity identifier and the sector identifier may be normalized based upon an overall entity identifier count. For example, a $M&PB entity identifier of a Mom & Pop Bakery Company entity may have 100 co-occurrences with a #Food sector identifier out of 110 total comments comprising the $M&PB entity identifier, and a $SM entity identifier of a Shopping Mall entity may have 200 co-occurrences with the #Food sector identifier out of 90,000 total comments comprising the $SM entity identifier. Without normalization, the Shopping Mall entity may appear to be twice as relevant to a Food sector classification compared to the Mom & Pop Bakery Company entity, which may not accurately reflect public opinion. Thus, normalization may be performed and a result of the normalization may indicate that the Mom & Pop Bakery Company entity has a higher correlation than the Shopping Mall entity to the Food sector classification.

In an example, the entity may be classified into multiple sector classifications. For example, a second comment by a second user may be selected from the social network data (e.g., a social network message "Need to buy a couch" tagged with $StoreA and #CouchShopping). The second comment may comprise the entity identifier of the entity and a second sector identifier of a second sector. A second sector classification may be specified for the entity based upon the co-occurrence of the entity identifier and the second sector identifier within the second comment. For example, the second sector classification may indicate that the Store (A) Company entity is related to a Furniture sector classification. A value for a sector correlation metric between the entity and the second sector may be determined based upon a number of co-occurrences of the entity identifier and the second sector identifier within comments of social network data.

Sector classifications may be identified (e.g., a new emergent sector classification, such as nanotechnology, cloud computing, etc.) and/or updated (e.g., a value for a sector correlation metric may be increased or decreased based upon an updated count of co-occurrences between an entity identifier and a sector identifier) based upon updated social network data. In an example, the updated social network data may be evaluated in real-time as the updated social network data becomes available so that dynamic notifications of sector classifications (e.g., a new classification of an entity to a sector) may be pushed to a user having an interest in the sector. For example, a new sector classification of a Company (C) entity to a Gardening sector may be identified. A notification of the Company (C) entity may be dynamically pushed to a client (e.g., for display through a user interface, for access through a website, as an email, for notification by personal assistant functionality on a client device, etc.) that expressed an interest in the Gardening sector. In an example, the updated social network data may be evaluated to determine updated co-occurrence data derived from co-occurrences of the entity identifier and the sector identifier within the updated social network data (e.g., a relatively low co-occurrence of the $StoreA entity identifier and the #CouchShopping sector identifier may be determined). The sector classification may be updated based upon the updated co-occurrence data (e.g., the Store (A) Company entity may no longer relate to the Furniture sector or may now relate to the Furniture sector according to a lesser degree).

The sector classification may be provided to users through a user interface, such as an application user interface, a website, a personal assistant, email, mobile alerts, etc. In an example, a user interface may be determined as comprising a reference to the entity (e.g., a financial website may display entity summary information to the Store (A) Company entity). Sector classification data for the Store (A) Company entity may be evaluated to determine that the Store (A) Company entity may be classified into a Retail Clothing sector. A sector identifier element of the Retail Clothing sector may be displayed, such as through the user interface. The sector identifier element may comprise a link to a search for search results corresponding to the sector (e.g., a Retail Clothing sector identifier element may be displayed through the financial website such that a user may invoke the Retail Clothing sector identifier element to perform a search query used to obtain information relating to the Retail Clothing sector).

At 708, a sector search query may be received (e.g., a "videogames" sector search query). For example, the sector search query may be received through a sector search interface. At 710, responsive to the sector search query corresponding to a sector (e.g., a Videogame sector), a ranked list of entities (e.g., a Gaming Company entity, a Console Company entity, a TV Company entity, etc.), having sector classifications corresponding to the sector, may be included within search results for the sector search query. In this way, users may utilize the sector search interface to identify entities relating to a sector.

In an example, a knowledge graph may be generated based upon sector classifications that are assigned to entities using the social network data. Entity information may be provided based upon the knowledge graph. In an example, the knowledge graph may be displayed as an interactive knowledge graph that may be filtered based upon various information (e.g., stock price, sector type, company size, revenue, etc.). In an example, the knowledge graph may be used to identify a ranked set of entities corresponding to a sector above a threshold. The entity information may be provided through a user interface. At 712, the method ends.

Figure 8:
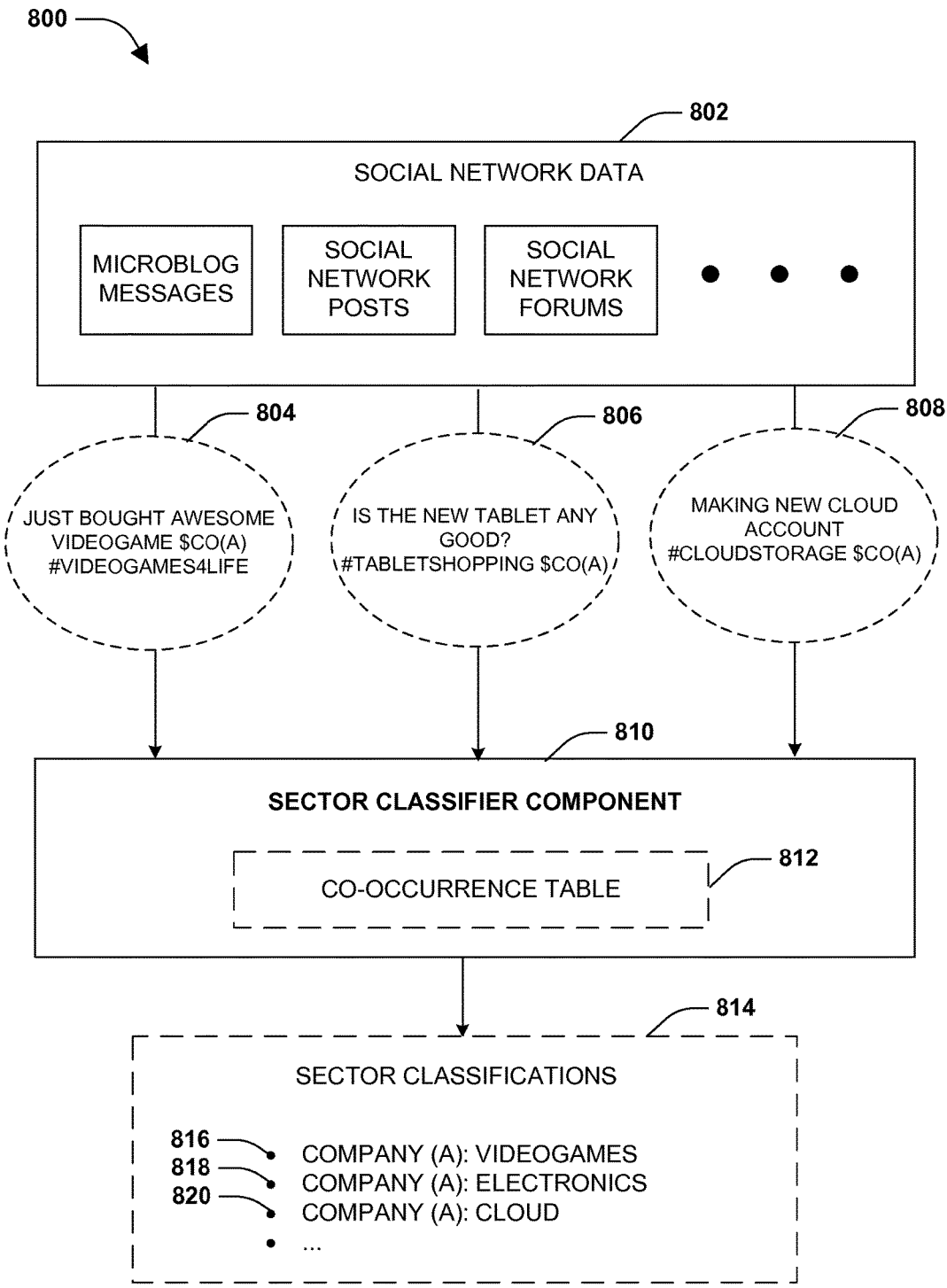
FIG. 8 is a component block diagram illustrating an exemplary system for classifying entities into sectors.

FIG. 8 illustrates an example of a system 800 for classifying entities into sectors. The system 800 comprises a sector classifier component 810. The sector classifier component 810 may be configured to select comments by users from social network data 802, such as microblog messages, social network posts, social network forums, and/or other data sources and/or services through which users may provide commentary. For example, a first comment 804 "Just bought awesome videogame $CO(A) #Videogames4Life" may be identified as comprising an entity identifier $CO(A) of a Company (A) entity and a sector identifier #Videogames4Life of a Videogames sector. A second comment 806 "Is the new tablet any good? #TabletShopping $CO(A)" may be identified as comprising the entity identifier $CO(A) of the Company (A) entity and a sector identifier # TabletShopping of an Electronics sector. A third comment 808 "Making new cloud account #CloudStorage $CO(A)" may be identified as comprising the entity identifier $CO(A) of the Company (A) entity and a sector identifier # CloudStorage of a Cloud sector (e.g., the Cloud sector may be a newly discovered sector that is identified based upon a threshold number of Cloud sector identifiers occurring within comments of the social network data 802).

The sector classification component 810 may build and/or populate a co-occurrence table 812 based upon comments from the social network data 802 (e.g., the co-occurrence table 812 may be built and/or evaluated to identify co-occurrences of entity identifiers and sector identifiers). The sector classifier component 810 may assign sector classifications 814 to the Company (A) entity, such as a Videogames sector classification 816, an Electronics sector classification 818, a Cloud sector classification 820, and/or other sector classifications to the Company (A) entity. For example, the co-occurrence table 812 may be evaluated, for assignment of sector classifications, to identify sector identifiers that co-occur with the entity identifier $CO(A) of the Company (A) entity in a threshold number of comments.

Figure 9:
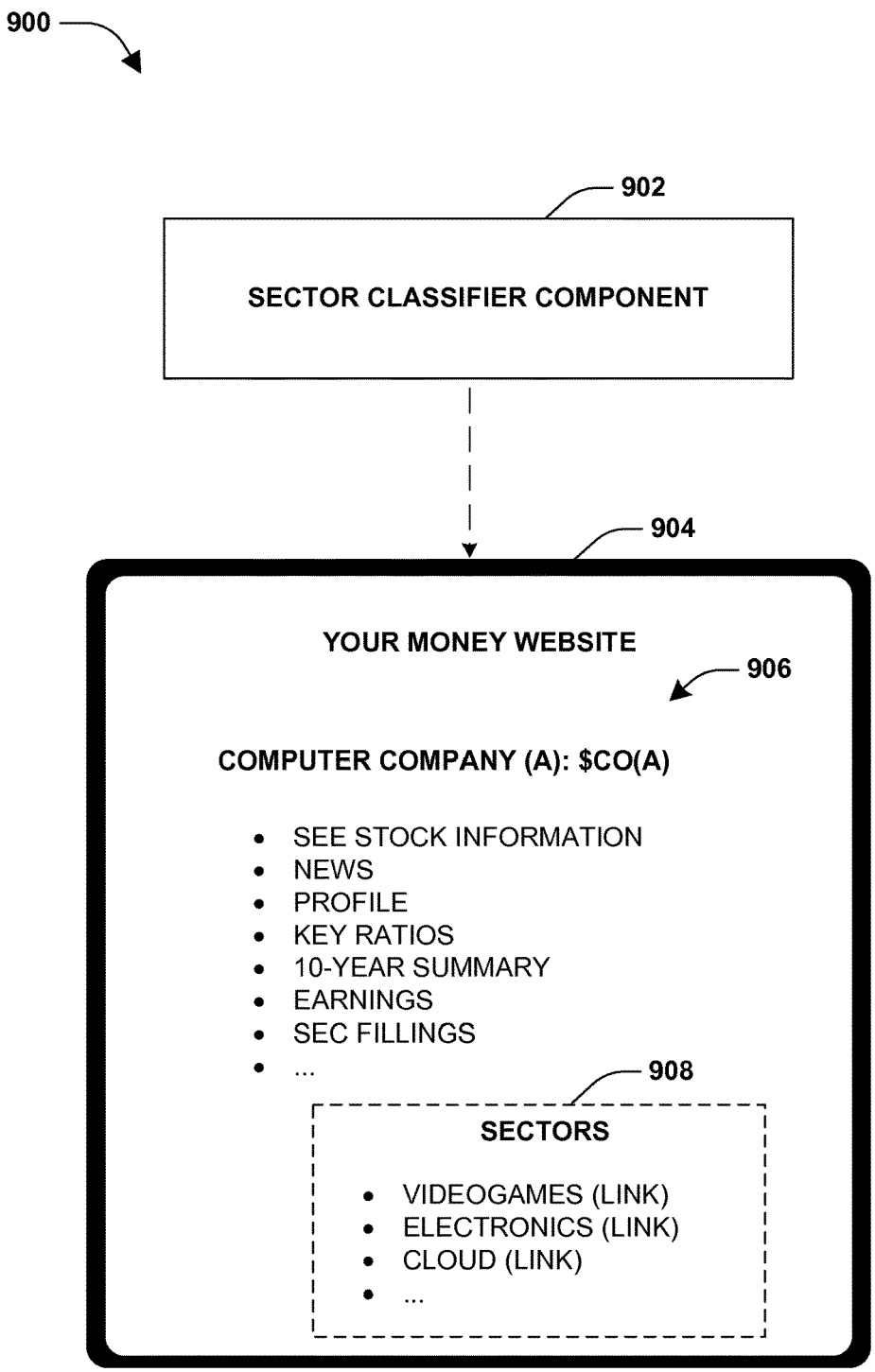
FIG. 9 is a component block diagram illustrating an exemplary system for providing sector classification information through a user interface.

FIG. 9 illustrates an example of a system 900 for providing sector classification information through a user interface. The system 900 comprises a sector classifier component 902. The sector classifier component 902 may be associated with a client device 904 (e.g., the sector classifier component 902 may be hosted on the client device 904, hosted on a server that is connected to but remote from the client device 904, or partially hosted on the client device 904 and partially hosted on the server). A user of the client device 904 may navigate to a Computer Company (A) entity summary webpage 906 of a Your Money website. The sector classifier component 902 may evaluate the Computer Company (A) entity summary webpage 906 to identify a Computer Company (A) entity identifier (e.g., $CO(A)) for a Computer Company (A) entity. The sector classifier component 902 may evaluate sector classifications assigned to entities (e.g., sector classifications 814 of FIG. 8) to identify a ranked set of sectors assigned to the Computer Company (A) entity (e.g., ranked based upon sector correlation metrics indicative of how much the Company (A) entity respectively relates to different sectors). The ranked lists of sectors (e.g., a Videogame sector, an Electronics sector, a Cloud sector, etc.) may be displayed through a sector interface 908, such as through the Computer Company (A) entity summary webpage 906. One or more of the sectors in the list may comprise links that may be clicked on, for example, to provide respective search results for the different sectors.

Figure 10:
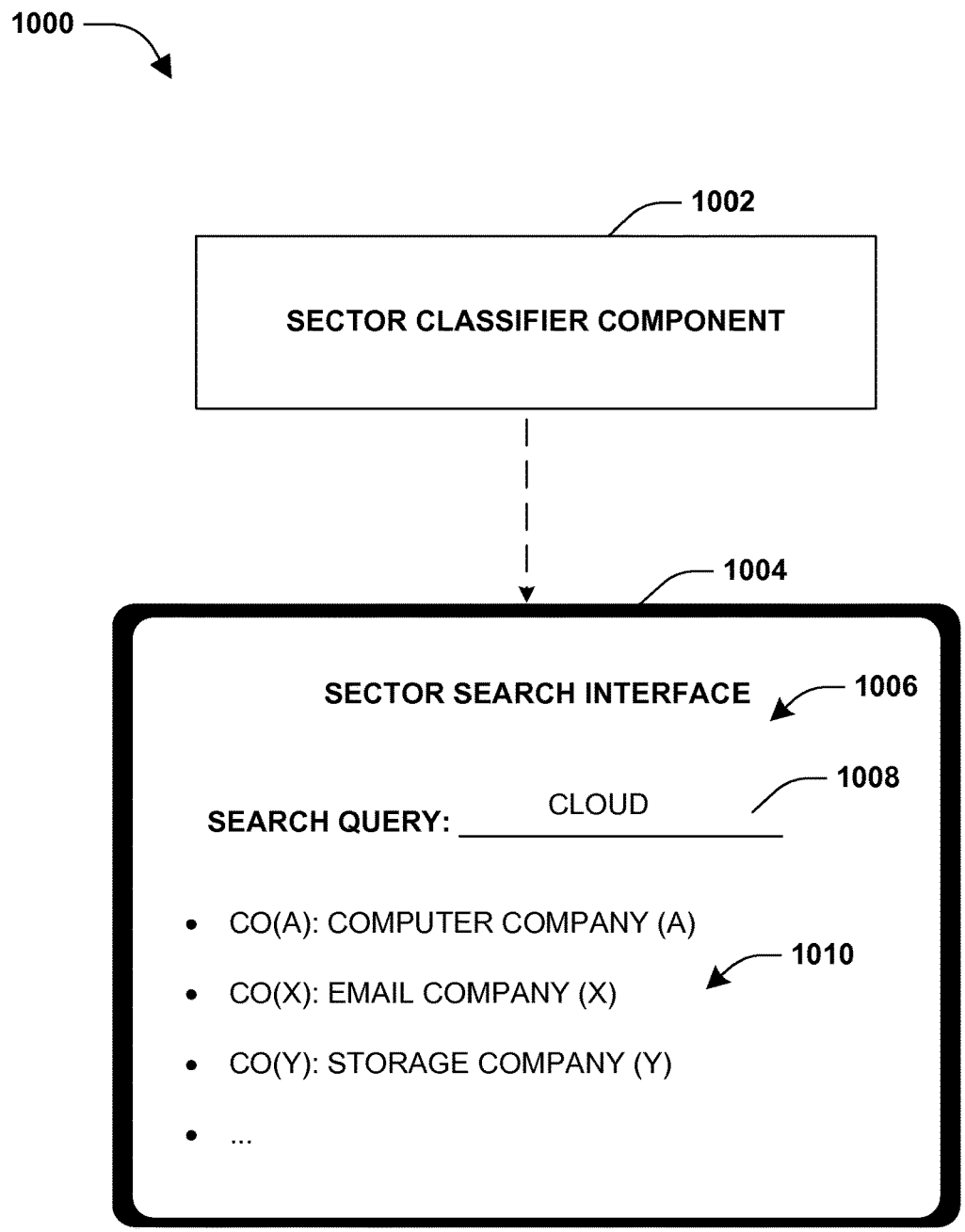
FIG. 10 is a component block diagram illustrating an exemplary system for displaying sector classifications through a sector search interface.

FIG. 10 illustrates an example of a system 1000 for displaying sector classifications through a sector search interface 1006. The system 1000 comprises a sector classifier component 1002. The sector classifier component 1002 may be associated with a client device 1004 (e.g., the sector classifier component 1002 may be hosted on the client device 1004, hosted on a server that is connected to but remote from the client device 1004, or partially hosted on the client device 1004 and partially hosted on the server). The sector classifier component 1002 may display the sector search interface 1006 though the client device 1004. A sector search query 1008 "Cloud" may be received through the sector search interface 1006. Responsive to the sector search query 1008 "Cloud" corresponding to a sector (e.g., a Cloud sector) that is assigned to one or more entities, a ranked list of entities, having sector classifications corresponding to the sector, may be included within search results 1010 for the sector search query 1008 "Cloud". For example, a Computer Company (A) entity, an Email Company (X) entity, a Storage Company (Y) entity, and/or other entities may have sector correlation metrics indicating that such entities correspond to the Cloud sector above a threshold. In this way, users may search for entities by submitting sector search queries through the sector search interface 1006.

According to an aspect of the instant disclosure, a method for identifying relationships between entities is provided. The method includes selecting a comment by a user from social network data of a social network. The comment comprises a first entity identifier of a first entity and a second entity identifier of a second entity. The method includes specifying a relationship between the first entity and the second entity based upon co-occurrence of the first entity identifier and the second entity identifier within the comment. The method includes receiving a search query corresponding to the first entity, and including at least one of a related search suggestion of the second entity or a search result associated with the second entity within search results for the search query based upon the relationship.

According to an aspect of the instant disclosure, a method for classifying entities into sectors is provided. The method includes selecting a comment by a user from social network data of a social network. The comment comprises an entity identifier of an entity and a sector identifier of a sector. The method includes specifying a sector classification for the entity based upon co-occurrence of the entity identifier and the sector identifier within the comment, where the sector classification corresponds to the sector. The method includes receiving a sector search query, and responsive to the sector search query corresponding to the sector, including a list of entities, having sector classifications corresponding to the sector, within search results for the sector search query, where the list of entities comprises the entity.

According to an aspect of the instant disclosure, a system for identifying relationships between entities is provided. The system includes a relationship definition component and a sector classifier component. The relationship definition component is configured to select a comment by a user from social network data of a social network. The comment comprises a first entity identifier of a first entity and a second entity identifier of a second entity. The relationship definition component is configured to specify a relationship between the first entity and the second entity based upon co-occurrence of the first entity identifier and the second entity identifier within the comment. The sector classifier component is configured to select a second comment by a second user from the social network data. The second comment comprises an entity identifier of an entity and a sector identifier of a sector. The sector classifier component is configured to specify a sector classification for the entity based upon co-occurrence of the entity identifier and the sector identifier within the second comment, where the sector classification corresponds to the sector.

According to an aspect of the instant disclosure, a means for identifying relationships between entities is provided. A comment by a user is selected from social network data of a social network, by the means for identifying relationships. The comment comprises a first entity identifier of a first entity and a second entity identifier of a second entity. A relationship between the first entity and the second entity is specified based upon co-occurrence of the first entity identifier and the second entity identifier within the comment, by the means for identifying relationships. A search query, corresponding to the first entity, is received, by the means for identifying relationships. At least one of a related search suggestion of the second entity or a search result associated with the second entity is included within search results for the search query, by the means for identifying relationships, based upon the relationship.

According to an aspect of the instant disclosure, a means for classifying entities into sectors is provided. A comment by a user is selected from social network data of a social network, by the means for classifying entities. The comment comprises an entity identifier of an entity and a sector identifier of a sector. A sector classification is specified for the entity based upon co-occurrence of the entity identifier and the sector identifier within the comment, by the means for classifying entities, where the sector classification corresponds to the sector. A sector search query is received, by the means for classifying entities. Responsive to the sector search query corresponding to the sector, a list of entities, having sector classifications corresponding to the sector, is included within search results for the sector search query, by the means for classifying entities, where the list of entities comprises the entity.

Figure 11:
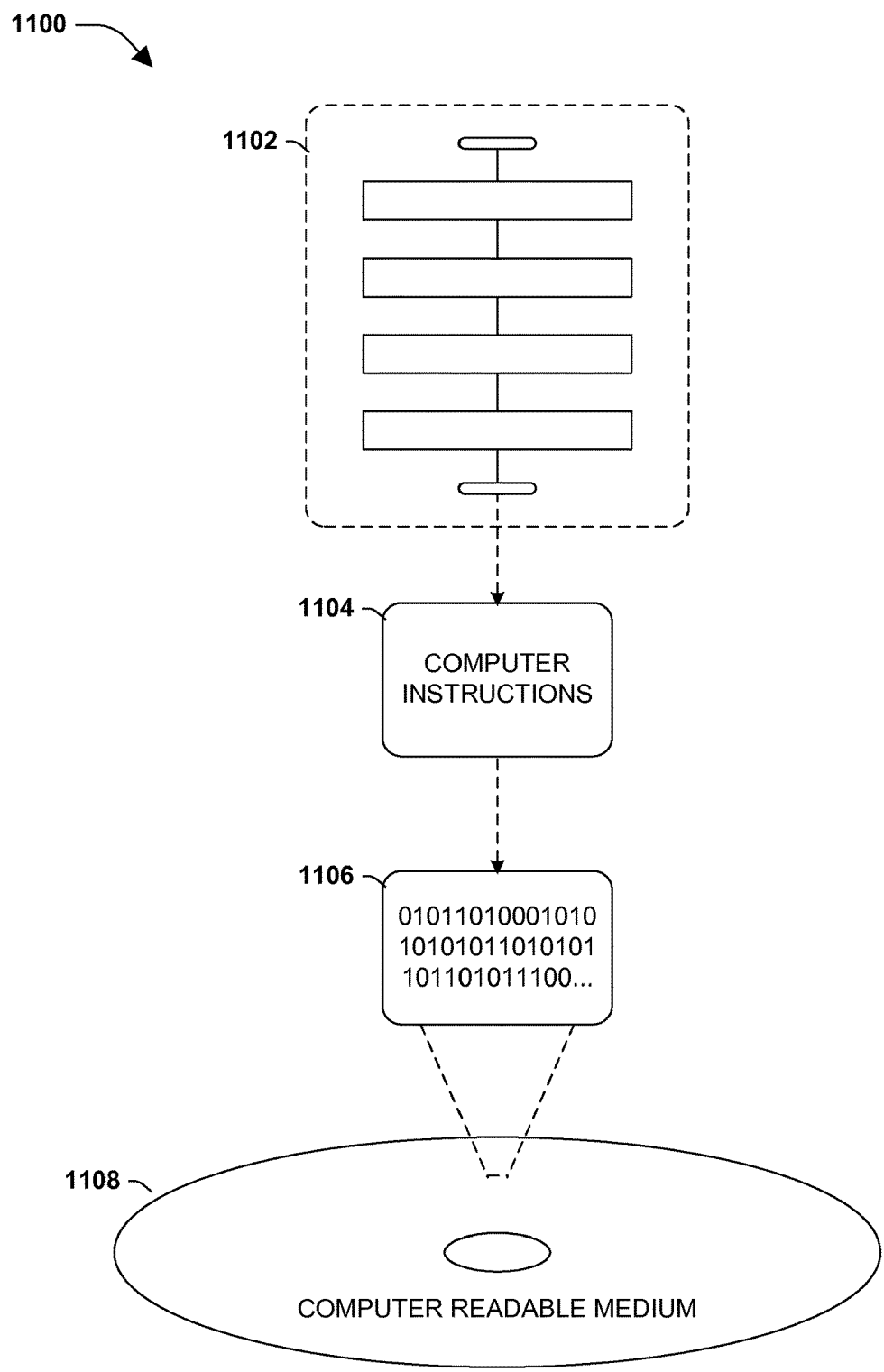
FIG. 11 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 11, wherein the implementation 1100 comprises a computer-readable medium 1108, such as a CD-R, DVD-R, flash drive, a platter of a hard disk drive, etc., on which is encoded computer-readable data 1106. This computer-readable data 1106, such as binary data comprising at least one of a zero or a one, in turn comprises a set of computer instructions 1104 configured to operate according to one or more of the principles set forth herein. In some embodiments, the processor-executable computer instructions 1104 are configured to perform a method 1102, such as at least some of the exemplary method 100 of FIG. 1 and/or at least some of the exemplary method 700 of FIG. 7, for example. In some embodiments, the processor-executable instructions 1104 are configured to implement a system, such as at least some of the exemplary system 200 of FIG. 2, at least some of the exemplary system 300 of FIG. 3, at least some of the exemplary system 400 of FIG. 4, at least some of the exemplary system 500 of FIG. 5, at least some of the exemplary system 600 of FIG. 6, at least some of the exemplary system 800 of FIG. 8, at least some of the exemplary system 900 of FIG. 9, and/or at least some of the exemplary system 1000 of FIG. 10, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 12:
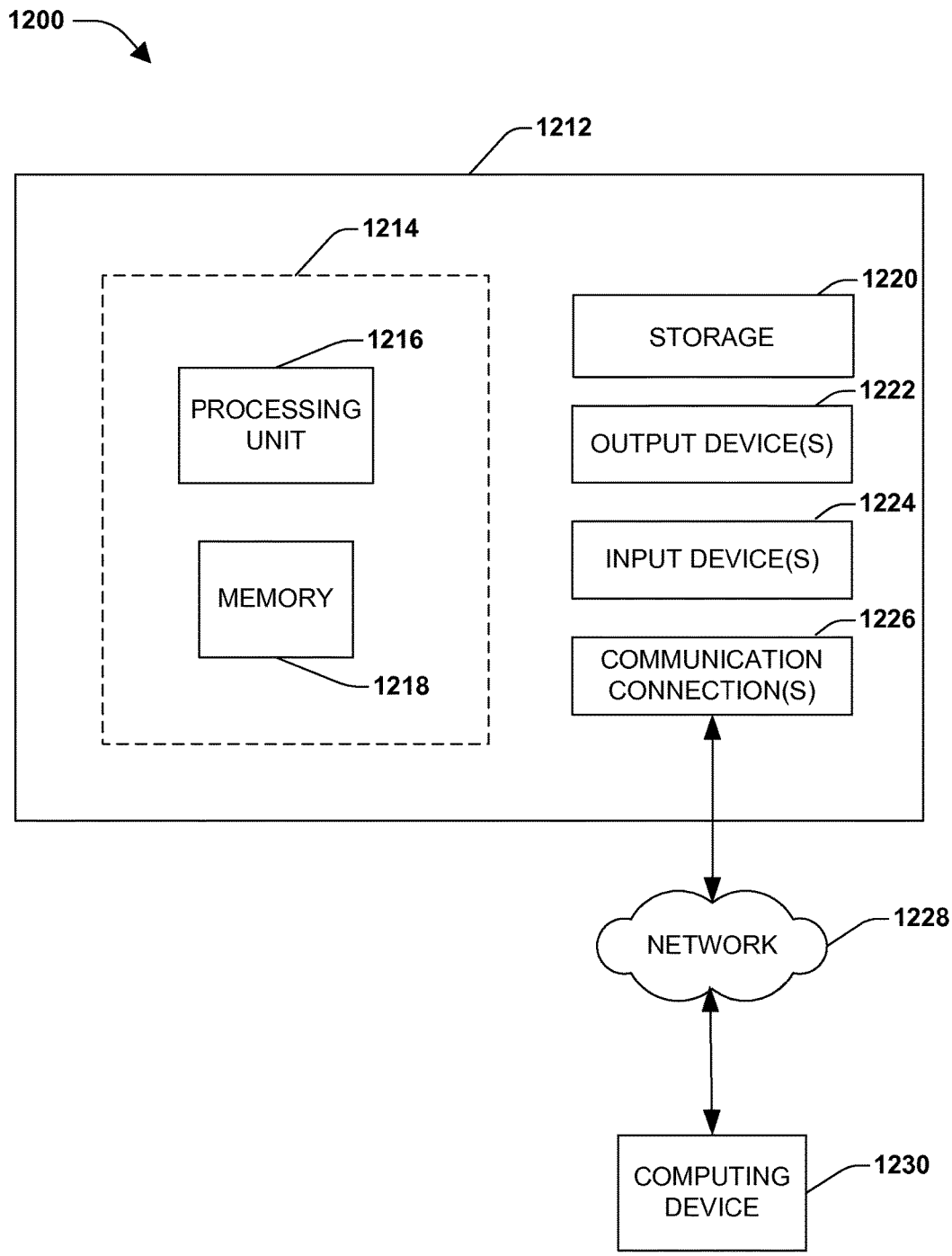
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1200 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 12 by dashed line 1214.

In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Computer storage media does not, however, include propagated signals. Rather, computer storage media excludes propagated signals. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via a network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a"

and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for providing enhanced computer search results with one or more computing devices while reducing consumption of processing resources, the method comprising:
    obtaining, at a first time, by the or more computing devices, a first set of current social network data;
    detecting, by the one or more computing devices, within the first set of social network data, an increase in a quantity of textual comments comprising both a first entity identifier of a first entity and a first sector identifier of a first sector;
    generating, at the one or more computing devices, a first sector classification of the first entity, as being part of the first sector, the generating being triggered by the detecting the increase in the quantity of the textual comments comprising both the first entity identifier and the first sector identifier;
    obtaining, at a second time subsequent to the first time, by the one or more computing devices, a second set of current social network data;
    detecting, by the one or more computing devices, within the second set of social network data, a decrease in the quantity of the textual comments comprising both the first entity identifier and the first sector identifier;
    deleting, at the one or more computing devices, in response to the detected decrease in the quantity of the textual comments, the first sector classification;
    receiving, at the one or more computing devices, a sector search query; and
    generating, by the one or more computing devices, search results responsive to the received sector search query, the generated search results comprising, if the first classification has previously been generated but has not yet been deleted, a list of entities that also have sector classifications that classify those entities as also being part of the first sector, the list of entities comprising the first entity.

2. The method of claim 1, wherein the generating the first sector classification comprises:
    normalizing a set of textual comments, from the first set of current social network data, that all have co-occurrences of the first entity identifier and the first sector identifier based upon an overall entity identifier count within the current social network data.

3. The method of claim 1, wherein the generating the search results comprises generating a sector identifier element for the first sector, the sector identifier element comprising a link to a search for the first sector.

4. The method of claim 1, comprising:
    generating a second sector classification of the first entity as also being part of a second sector, which differs from the first sector, based upon co-occurrences of the first entity identifier and a second sector identifier of the second sector within textual comments that are also part of the first set of current social network data.

5. The method of claim 1, wherein the generating the sector classification comprises updating a knowledge graph based upon sector classifications that are assigned to entities using the obtained social network data.

6. The method of claim 1, further comprising generating a value associated with the sector classification based upon a volume of additional textual comments, comprising both the first entity identifier and the first sector identifier, within both the first and second sets of the current social network data.

7. The method of claim 1, further comprising generating a value associated with the sector classification based upon a quantity of additional users generating the additional textual comments.

8. A computing device providing enhanced search results while reducing consumption of processing resources, the computing device comprising:
    one or more processing units; and
    memory comprising instructions that when executed by the one or more processing units cause the computing device to:
        obtain, at a first time, a first set of current social network data;
        detect, within the first set of social network data, an increase in a quantity of textual comments comprising both a first entity identifier of a first entity and a second entity identifier of a second entity;
        detect, within the first set of current social network data, an increase in a quantity of textual comments comprising both the first entity identifier and a first sector identifier of a first sector;
        generate, in a graph comprising a set of nodes connected by a set of edges, a first edge between a first node representing the first entity and a second node representing the second entity, the generated first edge being indicative of a relationship between the first entity and the second entity, the generating being triggered by the detecting the increase in the quantity of the textual comments comprising both the first and second entity identifiers;
        generate a first sector classification of the first entity, as being part of the first sector, the generating being triggered by the detecting the increase in the quantity of the textual comments comprising both the first entity identifier and the first sector identifier;
        obtain, at a second time subsequent to the first time, by the one or more computing devices, a second set of current social network data;

detect, within the second set of social network data, either a decrease in the quantity of the textual comments comprising both the first and second entity identifiers or a decrease in the quantity of the textual comments comprising both the first entity identifier and the first sector identifier;

delete the first sector classification if the decrease in the quantity of the textual comments comprising both the first entity identifier and the first sector identifier is detected; and delete the first edge if the decrease in the quantity of the textual comments comprising both the first and second entity identifiers is detected.

9. The computing device of claim 8, wherein the memory comprises further instructions that when executed by the one or more processing units cause the computing device to further:

generate a value associated with the first edge based upon a quantity of additional users generating the additional textual comments.

10. The computing device of claim 8, wherein the memory comprises further instructions that when executed by the one or more processing units cause the computing device to further:

generate a value associated with the sector classification based upon a volume of additional textual comments, comprising both the first entity identifier and the first sector identifier, within both the first and second sets of the current social network data.

11. The computing device of claim 8, wherein the instructions causing the computing device to generate the first sector classification comprise instructions that, when executed, cause the computing device to:

normalize a set of textual comments, from the first set of current social network data, that all have co-occurrences of the first entity identifier and the first sector identifier based upon an overall entity identifier count within the current social network data.

12. The computing device of claim 8, wherein the memory comprises further instructions that when executed by the one or more processing units cause the computing device to further:

generate a second sector classification of the first entity as also being part of a second sector, which differs from the first sector, based upon co-occurrences of the first entity identifier and a second sector identifier of the second sector within textual comments that are also part of the first set of current social network data.

13. The computing device of claim 8, wherein the memory comprises further instructions that when executed by the one or more processing units cause the computing device to further:

generate a value associated with the sector classification based upon a quantity of additional users generating the additional textual comments.

14. One or more computer storage media comprising computer-executable instructions, which, when executed by one or more computing devices, cause at least some of the one or more computing devices to:

obtain, at a first time, a first set of current social network data;

detect, within the first set of social network data, an increase in a quantity of textual comments comprising both a first entity identifier of a first entity and a first sector identifier of a first sector;

generate, a first sector classification of the first entity, as being part of the first sector, the generating being triggered by the detecting the increase in the quantity of the textual comments comprising both the first entity identifier and the first sector identifier;

obtain, at a second time subsequent to the first time, a second set of current social network data;

detect, within the second set of social network data, a decrease in the quantity of the textual comments comprising both the first entity identifier and the first sector identifier;

delete, in response to the detected decrease in the quantity of the textual comments, the first sector classification;

receive a sector search query; and generate, search results responsive to the received sector search query, the generated search results comprising, if the first classification has previously been generated but has not yet been deleted, a list of entities that also have sector classifications that classify those entities as also being part of the first sector, the list of entities comprising the first entity.

15. The one or more computer storage media of claim 14, wherein the computer-executable instructions for generating the first sector classification comprise computer-executable instructions, which, when executed, cause at least some of the one or more computing devices to:

normalize a set of textual comments, from the first set of current social network data, that all have co-occurrences of the first entity identifier and the first sector identifier based upon an overall entity identifier count within the current social network data.

16. The one or more computer storage media of claim 14, wherein the computer-executable instructions for generating the search results comprise computer-executable instructions, which, when executed, cause at least some of the one or more computing devices to generate a sector identifier element for the first sector, the sector identifier element comprising a link to a search for the first sector.

17. The one or more computer storage media of claim 14, comprising further computer-executable instructions, which, when executed, cause at least some of the one or more computing devices to:

generate a second sector classification of the first entity as also being part of a second sector, which differs from the first sector, based upon co-occurrences of the first entity identifier and a second sector identifier of the second sector within textual comments that are also part of the first set of current social network data.

18. The one or more computer storage media of claim 14, wherein the computer-executable instructions for generating the sector classification comprise computer-executable instructions, which, when executed, cause at least some of the one or more computing devices to update a knowledge graph based upon sector classifications that are assigned to entities using the obtained social network data.

19. The one or more computer storage media of claim 14, comprising further computer-executable instructions, which, when executed, cause at least some of the one or more computing devices to: generate a value associated with the sector classification based upon a volume of additional textual comments, comprising both the first entity identifier and the first sector identifier, within both the first and second sets of the current social network data.

20. The one or more computer storage media of claim 14, comprising further computer-executable instructions, which, when executed, cause at least some of the one or more computing devices to: generate a value associated with the sector classification based upon a quantity of additional users generating the additional textual comments.

* * * * *